United States Patent
Dieny et al.

(10) Patent No.: US 12,477,951 B2
(45) Date of Patent: Nov. 18, 2025

(54) METHOD FOR MANUFACTURING A SPINTRONIC DEVICE COMPRISING A THICK ACTIVE MAGNETIC LAYER

(71) Applicants: COMMISSARIAT À L'ENERGIE ATOMIQUE ET AUX ÉNERGIES ALTERNATIVES, Paris (FR); CENTRE NATIONAL DE LA RECHERCHE SCIENTIFIQUE (CNRS), Paris (FR)

(72) Inventors: Bernard Dieny, Grenoble (FR); Ioan-Lucian Prejbeanu, Grenoble (FR)

(73) Assignees: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE (CNRS) (FR)

( * ) Notice: Subject to any disclaimer, the term of this patent is extended or adjusted under 35 U.S.C. 154(b) by 621 days.

(21) Appl. No.: 17/416,337

(22) PCT Filed: Dec. 20, 2019

(86) PCT No.: PCT/EP2019/086677
§ 371 (c)(1),
(2) Date: Jun. 18, 2021

(87) PCT Pub. No.: WO2020/127970
PCT Pub. Date: Jun. 25, 2020

(65) Prior Publication Data
US 2022/0085285 A1      Mar. 17, 2022

(30) Foreign Application Priority Data

Dec. 21, 2018 (FR) .................................... 1873730

(51) Int. Cl.
*H01L 43/12* (2006.01)
*H10B 61/00* (2023.01)
(Continued)

(52) U.S. Cl.
CPC ............. *H10N 50/01* (2023.02); *H10B 61/00* (2023.02); *H10N 50/80* (2023.02)

(58) Field of Classification Search
CPC ......... H10B 61/00; H10N 50/01; H10N 50/80
See application file for complete search history.

(56) References Cited

U.S. PATENT DOCUMENTS 7,239,478 B1 *   7/2007   Sin .......................... G11B 5/3116
7,248,434 B2 *   7/2007   Dill ....................... G11B 5/1278
                                                                 360/125.03
(Continued)

FOREIGN PATENT DOCUMENTS

FR      3 027 453 B1      11/2017

OTHER PUBLICATIONS

International Search Report as issued in International Patent Application No. PCT/EP2019/086677, dated Feb. 6, 2020.

*Primary Examiner* — Jay C Kim
(74) *Attorney, Agent, or Firm* — Pillsbury Winthrop Shaw Pittman LLP

(57) ABSTRACT

A method for manufacturing a spintronic device including a non-magnetic spacer, a reference layer and a storage layer including a magnetic pillar, the method including depositing at least one sacrificial layer; forming at least one flared cavity, traversing the sacrificial layer; depositing at least one magnetic layer in the cavity; eliminating the excess of magnetic layer outside of the cavity; removing the dielectric layer in order to form at least one magnetic pillar forming all or part of the storage layer; depositing at least the non-magnetic spacer and the reference layer; filling the spaces (Continued)

between the magnetic pillars with a dielectric material; carrying out a polishing; forming an electrical contact on the surface of the element surmounting the magnetic pillar.

9 Claims, 5 Drawing Sheets

(51) Int. Cl.
*H10N 50/01* (2023.01)
*H10N 50/80* (2023.01)

(56) References Cited

U.S. PATENT DOCUMENTS

| | | | | |
|---|---|---|---|---|
| 7,467,461 B2 * | 12/2008 | Bonhote | ............... | G11B 5/3116 29/603.18 |
| 7,508,627 B1 * | 3/2009 | Zhang | ................ | G11B 5/3116 360/125.12 |
| 7,829,264 B1 * | 11/2010 | Wang | .................... | G11B 5/3163 430/311 |
| 7,983,001 B2 * | 7/2011 | Sato | ..................... | G11B 5/3163 360/125.06 |
| 8,015,692 B1 * | 9/2011 | Zhang | ................ | G11B 5/1278 427/127 |
| 8,137,570 B2 * | 3/2012 | Le | ......................... | G11B 5/3116 29/603.18 |
| 8,231,796 B1 * | 7/2012 | Li | ......................... | G11B 5/3163 216/96 |
| 8,322,023 B1 * | 12/2012 | Zeng | ..................... | G11B 5/3116 29/603.18 |
| 8,486,285 B2 * | 7/2013 | Zhou | ..................... | G11B 5/855 438/692 |
| 8,578,594 B2 * | 11/2013 | Jiang | ................... | G11B 5/3116 29/603.18 |
| 8,582,238 B1 * | 11/2013 | Liu | ........................ | G11B 5/315 360/125.3 |
| 8,724,259 B1 * | 5/2014 | Liu | ...................... | G11B 5/4886 360/125.15 |
| 8,793,866 B1 * | 8/2014 | Zhang | ................. | G11B 5/1278 29/603.15 |
| 9,018,100 B2 * | 4/2015 | Chen | ..................... | G11B 5/3116 438/692 |
| 9,349,392 B1 * | 5/2016 | Zeng | ................... | G11B 5/1278 |
| 9,431,608 B2 * | 8/2016 | Perniola | ............... | H10N 70/023 |
| 9,496,488 B2 * | 11/2016 | Kwon | .................... | H10N 50/85 |
| 10,056,266 B2 * | 8/2018 | Dieny | ................. | H10N 59/00 |
| 10,283,148 B1 * | 5/2019 | Chen | .................. | G11B 5/398 |
| 10,522,741 B1 * | 12/2019 | Yang | ..................... | H01F 41/308 |
| 10,937,828 B2 * | 3/2021 | Hashemi | ............ | G11C 11/5607 |
| 11,024,797 B2 * | 6/2021 | Yang | ..................... | H01F 41/308 |
| 11,049,537 B2 * | 6/2021 | Dukovic | ............... | G11C 11/161 |
| 2013/0015540 A1 | 1/2013 | Choi | | |
| 2013/0029431 A1 | 1/2013 | Takahashi et al. | | |
| 2013/0062308 A1 * | 3/2013 | Funayama | ........... | G11B 5/3163 427/127 |
| 2015/0194595 A1 | 7/2015 | Park et al. | | |
| 2015/0236251 A1 | 8/2015 | Noh et al. | | |
| 2016/0218280 A1 | 7/2016 | Park et al. | | |
| 2017/0309497 A1 * | 10/2017 | Dieny | ................. | H10N 70/245 |

* cited by examiner

Fig. 1
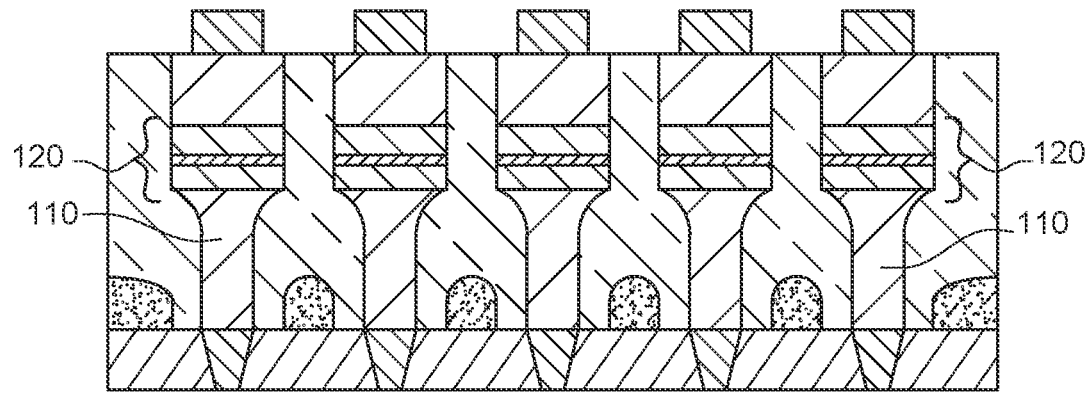
Fig. 2a
Fig. 2b
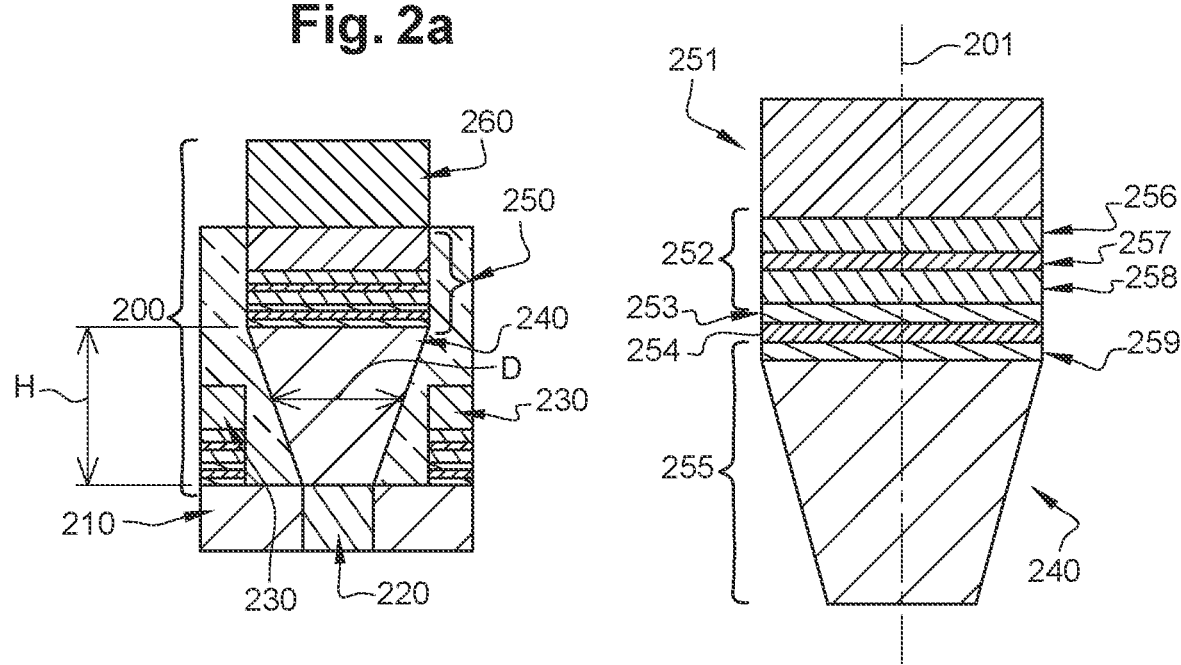
Fig. 3
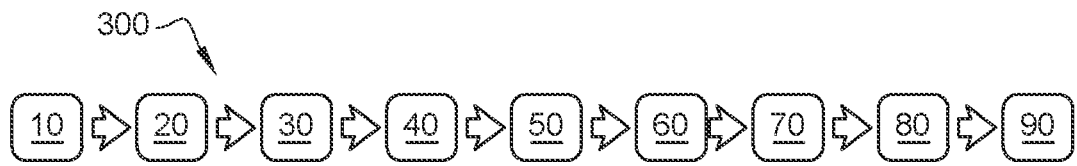

METHOD FOR MANUFACTURING A SPINTRONIC DEVICE COMPRISING A THICK ACTIVE MAGNETIC LAYER

CROSS-REFERENCE TO RELATED APPLICATIONS

This application is the U.S. National Stage of PCT/EP2019/086677, filed Dec. 20, 2019, which in turn claims priority to French patent application number 1873730 filed Dec. 21, 2018. The content of these applications are incorporated herein by reference in their entirety.

TECHNICAL FIELD OF THE INVENTION

The technical field of the invention is that of spintronics. The present invention relates to a method for manufacturing spintronic devices comprising a thick magnetic layer and in particular the manufacture of magnetic random access memories (MRAMs) with spin transfer torque (STT) or spin orbit torque (SOT), magnetic field sensors and radiofrequency components using spin transfer torque (STT) or spin orbit torque (SOT).

TECHNOLOGICAL BACKGROUND OF THE INVENTION

The memories the most commonly used as working memories, DRAMs (dynamic random access memories) and SRAMs (static random access memories) are volatile, that is to say that they have to be continually supplied with a voltage to conserve information. These memories have more and more problems of energy consumption, notably in static mode, on account of an increased leakage current due to their reduction in size.

An alternative to these memories is the FLASH memory, which is non-volatile. But a major drawback of its use is its writing endurance limited to at the most 100,000 cycles.

Thus, other types of non-volatile memory have been developed, with various degrees of maturity, notably phase change random access memories (PCRAMs), conductive bridge random access memories (CBRAMs) or instead oxide random access memories (OxRAMs), ferroelectric random access memories (FeRAMs) and magnetic random access memories (MRAMs). Apart from FeRAMs, which operate according to the principle of the orientation of a dipolar electric moment in a ferroelectric material, all the other memories use variable electrical resistance materials. Each information bit is stored in a variable resistance element and encoded by the resistance value of this storage element (typically the logic level '0' corresponds to a high resistance value and the logic level '1'corresponds to a low resistance value).

In MRAMs in particular, the storage element is a magnetic tunnel junction having a tunnel magnetoresistance effect. Writing in a MRAM comes down to orienting the magnetisation of one of the magnetic electrodes of the tunnel junction (electrode designated storage layer) parallel or antiparallel to the magnetisation of the second electrode of fixed magnetisation designated reference layer.

In the first family of MRAMs, writing was done by magnetic field pulses. Commercially available products of the EVERSPIN™ Company called Toggle MRAM have used this writing method since 2006. However, the density of these memories is limited to several Mbits because the current needed to produce the magnetic field pulses (~10 mA), does not make it possible to go down to technological nodes less than 90 nm.

The second family of MRAMs that today retains the greatest attention is the family of MRAMs written by spin transfer torque (STT). These are called STT-MRAMs. The phenomenon of spin transfer was predicted in 1996 by Slonczewski (Slonczewski, J. C., 1996, "Current driven excitations of magnetic multilayers," J. Magn. Magn. Mater. 159, L1-L7) and Berger (Berger, L., 1996, "Emission of spin waves by a magnetic multilayer traversed by a current", Phys. Rev. B 54, 4828-4830) and the possibility of using this phenomenon to switch the magnetisation of magnetic layers was experimentally demonstrated for the first time in 2000 (Katine, J. A., F. J. Albert, R. A. Buhrman, E. B. Myers, and D. C. Ralph, 2000, "Current-driven magnetization reversal and spin-wave excitations in Co/Cu/Co pillars," Phys. Rev. Lett. 84, 3149-3152).

The use of spin transfer torque (STT) to write in a magnetic tunnel junction provides a better configuration, in particular when the density is important, that is to say when the memory is of small size (typically less than 50 nm diameter).

STT-MRAMs of the prior art use magnetic tunnel junctions with perpendicular anisotropy as storage elements. In these magnetic tunnel junctions, the magnetic anisotropy arises from phenomena of electronic hybridisation occurring at the magnetic metal/oxide interface, the oxide being the material forming the tunnel barrier of the junction, usually MgO.

To manufacture these magnetic tunnel junctions used in non-volatile memories or in other spintronic components (magnetic logic units (MLU), or magnetic field sensors for example), the document FR3027453B1 (B. DIENY et al. [FR]) proposes a method for manufacturing a resistive device for memory or logic circuit.

[FIG. 1] represents this device. It describes a method for nanostructuring magnetic tunnel junctions 120 making it possible to avoid etching the magnetic stack (in particular the magnetic tunnel junctions). The manufacturing method according to this document consists in depositing this stack 120 on a pre-etched metal pillar 110 or an array of such pillars. In the course of the deposition of the stack by a physical deposition method (for example cathodic sputtering), the material nanostructures itself naturally while being deposited on the top of the pre-etched pillars. In the case of the production of MRAM (magnetic random access memory) type memory cells based on magnetic tunnel junctions, the memory points are formed by depositions carried out at the top of each of the pillars.

However, this manufacturing method is limited to the case where the storage layer of the magnetic tunnel junction is thin. In this case, the interfacial perpendicular anisotropy at the interface between the storage layer and the tunnel barrier is partially counterbalanced by the shape anisotropy of the storage layer, which favours planar anisotropy. Hence, the effective anisotropy is reduced. Even using a storage layer inserted between two tunnel barriers, the effective anisotropy is not sufficient to ensure a sufficiently long retention of the memory when the dimension of the tunnel junctions becomes less than thirty or so nanometres (typically ten or so years according to industrial requirements). Furthermore, this anisotropy varies considerably as a function of temperature (typically by at least 40% over 100° C.), which is bothersome for an operation of the memory over a wide range of temperatures (such as for example for automobile applications having to operate between −40° C. and +150° C.).

Recently, K. Watanabe et al. (K. Watanabe, B. Jinnai, S. Fukami, H. Sato & H. Ohno, "Shape anisotropy revisited in single-digit nanometer magnetic tunnel junctions", 14 Feb. 2018, Nature Communications 9, Article number 663) and N. Perrissin et al. (N. Perrissin, S. Lequeux, N. Strelkov, L. Vila, L. Buda-Prejbeanu, S. Auffret, R. C. Sousa, I. L. Prejbeanu, B. Dieny, "Highly thermally stable sub-20 nm magnetic random-access memory based on perpendicular shape anisotropy", Nanoscale, 2018, 10, 12187-12195, DOI: 10.1039/C8NR01365A) have proposed a magnetic tunnel junction for memory cells in which the thickness of the storage layer has been very significantly increased to values of the same order of magnitude as their diameter to make it possible to benefit from out-of-plane anisotropy (or PSA, perpendicular shape anisotropy), adding to the interfacial anisotropy existing at the oxide/magnetic metal interface. Hence, the interfacial anisotropy and the shape anisotropy both favour an out-of-plane orientation of the magnetisation which considerably reinforces the effective anisotropy and thus makes it possible to decrease the size of the memory points while maintaining sufficient retention. This makes it possible to increase the thermal stability of the storage layer and thus extend the scalability of the memory points (whether they are STT-MRAMs or SOT-MRAMs). Indeed, a thick layer has magnetic properties much closer to the bulk material than a very thin layer such as the storage layers normally used in p-STT-MRAMs of the prior art (layers of 1.5 nm to 2 nm thickness). In particular, thermal fluctuations develop less quickly as a function of temperature than in a very thin layer. Indeed, it is known that on account of the reduced number of neighbouring atoms on the surface of a magnetic layer, the temperature of magnetic order tends to decrease in magnetic layers by several atomic planes thickness. This means that thermal fluctuations develop in a more important manner in very thin layers than in bulk materials of same composition. In the context of p-STT-MRAMs of the prior art, this results in a rapid decrease in the tunnel magnetoresistance and the magnetic anisotropy as a function of temperature, which is bothersome if the device has to operate over a wide temperature range (−40° C. to +150° C. for automobiles) or must keep the memory during a soldering operation being able to lead to a rise in temperature to 260° C. for one minute (solder reflow compliance). Thus, since the writing current is proportional to the barrier energy Eb=KV (K effective anisotropy of the active magnetic layer, V volume of this layer), separating a magnetic state of the memory (representing "0") from the other state (representing "1"), the strong anisotropy variation K over the operating range of conventional STT-MRAMs leads to a low retention at the upper limit of the operating range and to a strong writing current at the lower limit of the operating range. Thanks to the use of thick magnetic layers as proposed by K. Watanabe et al. and N. Perrissin et al., this thermal variation, which resembles much more that of the bulk material, is greatly decreased. Thus, as an example, bulk cobalt only sees its magnetisation vary by several % (5 to 7%) between −40° C. and 150° C. whereas in layers of 1.5 nm thickness, this variation may be 30 to 40%. The thermal stability factor, for its part, may be adjusted by playing on the shape of the storage layer and in particular on its thickness. As is known to those skilled in the art, the value desired for this thermal stability factor lies between 60 and 100 depending on the acceptable error rate for the memory and its capacity.

A second advantage of a thick storage layer concerns the Gilbert damping, which directly intervenes in the writing current. As long as the macrospin regime is maintained, the Gilbert damping that intervenes in the writing current value is the Gilbert damping averaged over the whole volume of the storage layer. Optimisations are then possible to obtain a strong tunnel magnetoresistance and a low average damping, as explained hereafter.

More generally, this concept of spintronic devices using such thick active magnetic layers may be used for other functionalities such as magnetic field sensors or radiofrequency spintronic devices, making it possible to reduce the dimensions thereof to sizes below several tens of nanometres.

The main difficulty associated with these spintronic devices of dimensions less than 30 nm comprising thick magnetic layers concerns their manufacture. Indeed, there does not exist for the moment a reliable manufacturing method making it possible to form arrays of elementary devices of resolution F less than 30 nm comprising thick magnetic layers of thickness of same order of magnitude as their diameter and with a pitch less than 3F.

Thus, although the document FR3027453B1 proposes a method for manufacturing spintronic devices of resolution less than 30 nm, this has drawbacks in the case where the storage layer of the magnetic tunnel junction is thick. Indeed, the deposition methods commonly used for the deposition of magnetic tunnel junctions, in particular cathodic sputtering, are not very directive. In other words, an angular dispersion of the spaces deposited during the deposition exists. Hence, when the deposition is carried out on pre-structured metal pillars as described previously, the deposited material tends to overflow onto the sides of the pillars, which may lead to effects of electrical short-circuits through the tunnel barrier and between the deposition at the top of the pads and in the trenches separating the pads. This problem is all the more marked when the thickness of the deposited material is important. Furthermore, to avoid direct contact between the deposition in the trenches between the pillars and the deposition at the top of the pre-structured pillars, it is necessary that the height of the pre-structured pillars is significantly greater than the thickness of the deposition carried out. If the deposition is thick, the pre-structured pillars must have an important aspect ratio (height/diameter) which complicates their manufacture.

There thus exists a need to be able to manufacture a spintronic device comprising a magnetic layer of thickness of same order of magnitude as its average diameter without posing these problems.

SUMMARY OF THE INVENTION

The invention offers a solution to the aforementioned problems, by proposing a method for manufacturing a spintronic device.

One subject matter of the present invention thus relates to a method for manufacturing a spintronic device comprising at least a non-magnetic spacer, a reference layer and a storage layer comprising at least one magnetic pillar comprising the following steps:
  Depositing at least one sacrificial layer of a thickness at least equal to that of the pillar that it is desired to form on a substrate comprising at least one conductive zone emerging on the surface of the substrate;
  Forming at least one flared cavity, traversing said sacrificial layer, the base of which is facing the surface of said conductive zone of the substrate;

Depositing at least one magnetic layer in said cavity, of thickness at least equal to that of the magnetic pillar that it is desired to form;

Eliminating the excess of magnetic layer outside of the cavity and planarizing the surface of said magnetic layer to reach the targeted magnetic pillar thickness;

Removing at least a part of the dielectric layer in order to form, from the remaining magnetic layer, at least one magnetic pillar forming all or part of the storage layer of said spintronic device;

Depositing at least the non-magnetic spacer and the reference layer such that each magnetic pillar is surmounted by at least said non-magnetic spacer and said reference layer;

Filling the spaces between the magnetic pillars with a dielectric material;

Carrying out a polishing to eliminate the excess of dielectric filling material deposited at the preceding step in order to have access to the upper surface of the element surmounting the pillar;

Forming an electrical contact at the surface of the element surmounting the magnetic pillar.

Thanks to the invention, the whole of the spintronic device is simpler to manufacture than in the prior art. Indeed, the magnetic pillar that forms all or part df the storage layer may be manufactured by a method well controlled in microelectronics, for example using a damascene method for the manufacture df interconnections or vias between different metal levels using CMOS technology. The method consists in filling with magnetic material a cavity or a trench formed beforehand in a dielectric material followed by chemical mechanical polishing. Next, all or part of the dielectric material surrounding the pillars thus formed is removed to obtain one or a plurality of magnetic pillars in relief on the substrate. The remainder of the layers forming the spintronic device are deposited on the magnetic pillar. Material is deposited at the top of the pillars and another part is deposited around the pillars, in the trenches separating them. This material that falls into the trenches does not disrupt the operation of the device. It may even help it by playing the role of screen absorbing the magnetic flux emanating from the deposition at the top df the pillars. Advantageously, the deposition of the other layers forming the active stack is self-aligned on the magnetic pillars, which greatly simplifies the manufacture of the device.

Finally, the device according to the invention will comprise a magnetic pillar of flared shape fulfilling the function of thick magnetic layer comprised in the storage layer, said magnetic pillar being of height H of the order of magnitude of a characteristic dimension D of a planar section of the pillar, surmounted and surrounded by the other layers, forming the spintronic device. Same order df magnitude is taken to mean that the height H of the pillar may be between 0.25 and 5 times a characteristic dimension of the planar section of the pillar, this characteristic dimension being for example in the case of a conical pillar its average diameter, this average being taken over the height of the pillar.

According to an advantageous embodiment, each magnetic pillar is surrounded in the zone separating the pillars by a stack comprising at least said non-magnetic spacer and said reference layer, this stack not having electrical contact with said magnetic pillar, and being buried by said dielectric filling material.

Apart from the characteristics that have been described in the preceding paragraph, the method according to one aspect of the invention may have one or more complementary characteristics among the following, considered individually or according to all technically possible combinations thereof:

The step of depositing the non-magnetic spacer and the reference layer is carried out such that each magnetic pillar is further surrounded by at least said non-magnetic spacer and said reference layer and such that there is no electrical contact between said magnetic pillar and at least said non-magnetic spacer and the reference layer surrounding said pillar;

The step of forming the cavities is carried out with a "damascene" or "dual damascene" approach;

The cavities produced during the step of forming the cavities have a section at their base smaller than at their top;

The magnetic layer is formed of several layers of magnetic and non-magnetic materials, in such a way that the proportion of magnetic materials compared to non-magnetic materials is sufficient so that the shape anisotropy of the magnetic pillar is greatly reduced in the plane or even becomes out-of-plane;

The magnetic layer is mainly formed of a magnetic material having a low Gilbert damping;

The spintronic device is a perpendicular shape anisotropy spin transfer torque magnetic random access memory point or PSA-STT-MRAM;

The spintronic device is a perpendicular shape anisotropy spin orbit torque random access memory point or PSA-SOT-MRAM;

The spintronic device is a magnetic field sensor;

The spintronic device is a radiofrequency component;

The invention and the applications thereof will be better understood on reading the description that follows and by examining the figures that accompany it.

BRIEF DESCRIPTION OF THE FIGURES

The figures are presented for indicative purposes and in no way limit the invention.

FIG. 1 shows a schematic representation of the result of a method for manufacturing a spintronic device according to the prior art.

FIGS. 2a and 2b show a spintronic device obtained by the method according to the invention.

FIG. 3 shows a schematic representation of the steps of the method according to the invention.

FIG. 10b shows a schematic representation of the result of the sixth step of the method according to an embodiment of the invention.

DETAILED DESCRIPTION

Figure 4:
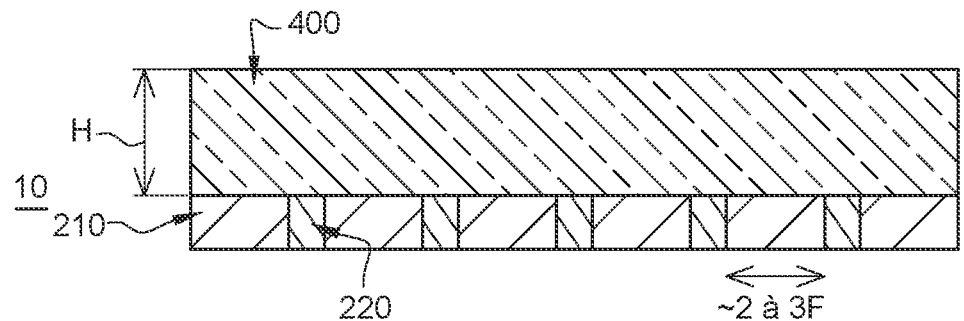
FIG. 4 shows a schematic representation of the result of the first step of the method according to the invention.

Unless stated otherwise, a same element appearing in the different figures has a single reference.

FIGS. 2a and 2b represent an embodiment of a spintronic device 200, the subject matter of the manufacturing method according to the invention.

[FIG. 2a] represents the spintronic device 200 comprising a magnetic pillar 240 of height H and of characteristic dimension D.

The spintronic device comprises in addition a plurality of magnetic and non-magnetic layers 250 in electrical contact with the magnetic pillar 240 and an upper electrode 260 in electrical contact with the upper layer of the plurality of layers 250. The spintronic device 200 is in electrical contact with a conductive zone 220 formed in a substrate 210.

The conductive zone 220 may be a via such as those produced using CMOS (complementary metal oxide semiconductor) technology. The magnetic pillar 240 is formed in such a way as to be in electrical contact with the conductive zone 220, that is to say that the base of the magnetic pillar 240 is in contact with the conductive zone and for example that the vertical axis 201 of the magnetic pillar 240 is aligned with the horizontal axis of the conductive zone 220 such as represented in FIG. 14 or with the centre of the conductive via 220.

"Vertical axis 201 of the magnetic pillar 240" is taken to mean the vertical axis 201 passing through the centre of the base of the magnetic pillar 240 and through the centre of the top of the magnetic pillar 240.

Figure 14:
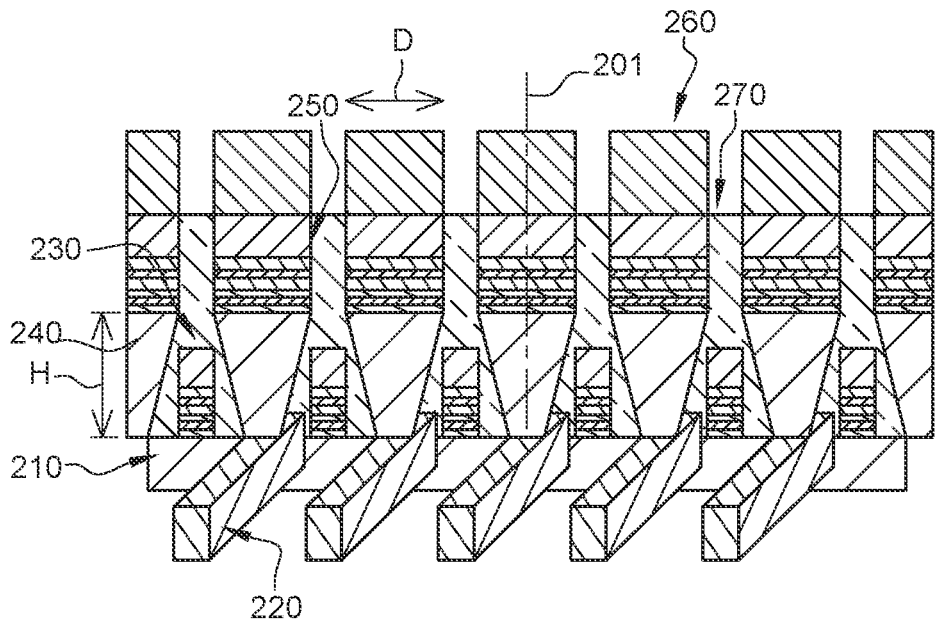
FIG. 14 represents a plurality of memory points of a SOT-MRAM spintronic device with thick active magnetic layer obtained by the method according to the invention.

"Horizontal axis of the conductive zone 220" is taken to mean the horizontal axis cutting the conductive zone 220 in two in the direction of the length along the plane of the substrate 210 when the conductive zone has a horizontal line shape as in FIG. 14.

Hereafter, the term "conductive zone 220" will be employed indifferently to designate a conductive zone or a conductive via.

The magnetic pillar 240 has a magnetisation that is switchable between two magnetisation states substantially normal to the plane of the substrate 210: upwards or downwards magnetisation.

The magnetic pillar 240 is of height H of same order of magnitude as a characteristic dimension D of a planar section of the magnetic pillar 240.

"Of same order of magnitude" is taken to mean that the magnetic pillar 240 is of a height H situated between 0.25 and 5 times a characteristic dimension D of a planar section of the magnetic pillar 240.

"Planar section of the magnetic pillar 240" is taken to mean a section of the magnetic pillar 240 along the plane of the substrate 210.

"Characteristic dimension D" is taken to mean a dimension of said planar section. For example, in the case of a magnetic pillar 240 having a circular section, the characteristic dimension D of a planar section of the magnetic pillar 240 may be chosen as being the average diameter of the pillar, this diameter being the value of the diameters averaged over the height of the pillar. In the case of an elliptical section, the characteristic dimension D may be chosen as being double the small axis or the large axis of the ellipse.

The magnetic pillar 240 serves to naturally structure the spintronic device 200. Indeed, the magnetic pillar 240 is of flared shape, that is to say that the surface of its base is smaller than the surface of its top. Thanks to its shape, during the deposition of the plurality of magnetic and non-magnetic layers 250, the layers are discretised at the top of the magnetic pillar 240 and around it. This makes it possible not to have need to etch a posteriori each layer of the plurality of layers 250. Another advantage is that the deposition of the plurality of layers forming the spintronic device is automatically aligned on the magnetic pillars 240, which simplifies the manufacture of the device.

Hereafter, reference will be made to the layers that are deposited at the top of the magnetic pillar 240 by the term "layers 250" whereas reference will be made to the layers deposited around the magnetic pillar 240 by the term "layers 230".

During the manufacture of several spintronic devices on the same substrate 210, the magnetic pillars 240 are sufficiently electrically isolated from each other, despite the presence of the plurality of layers 230 at the bottom of the trenches separating the pillars 240, thanks to the fact that the layers 230 do not touch the sides at the base of the pillars. Indeed, the deposition of the layers 230 and 250 being carried out according to a substantially directive method, preferably by physical vapour deposition (PVD) such as cathodic sputtering or evaporation, the upper part overhanging each pillar prevents by shading effect the deposition of the material at the foot of the sides. In fact, the plurality of layers 230 at the bottom of the trenches separating the pillars may even improve the operation of the device by playing the role of screen absorbing the magnetic flux emanating from the deposition of the layers 250 at the top of the magnetic pillars 240.

The magnetic pillar 240 and the layers 230 and 250 are embedded in a dielectric material 270 in order to reinforce the structure of the device and to be able next to produce the upper electrical contact 260.

[FIG. 2b] represents the magnetic pillar 240 and the other magnetic and non-magnetic layers forming the spintronic device 200. "Other magnetic and non-magnetic layers" is taken to mean all the layers forming the spintronic device 200 except the layer or the layers forming the magnetic pillar 240.

The spintronic device 200 according to the embodiment thus comprises at least a storage layer 255, a non-magnetic spacer 254, a reference layer 253 of fixed out-of-plane magnetisation, a synthetic antiferromagnetic layer 252 and an upper layer for opening the electrical contact 251.

The storage layer 255 comprises the magnetic pillar 240 and a magnetic layer 259. This layer 259 is composed for example of a lower transition layer made of Mo of 0.2 nm (not represented) and an upper layer made of FeCoB alloy of 2 nm. The magnetic pillar 240, in addition to naturally structuring the spintronic device during manufacture, forms all or part of the storage layer 255. The thick magnetic layer that forms the pillar 240 is thus going to make it possible to reinforce the effective out-of-plane anisotropy of the layers, of the spintronic device 200.

When the spacer 254 is a tunnel barrier, said tunnel barrier is for example composed of a layer of MgO of 1 nm. If this spacer is a non-magnetic conductor, it may be made for example of copper or silver.

The reference layer 253 of fixed out-of-plane magnetisation is composed for example of a lower interfacial layer made of FeCoB alloy of 1.7 nm and an upper transition layer made of Mo of 0.2 nm (not represented).

The synthetic antiferromagnetic layer 252 is well known to those skilled in the art. It is composed of two magnetic layers 256 and 258, the magnetisations of which are coupled in an antiparallel manner through a thin layer 257 ensuring an antiparallel coupling between the magnetisations of the magnetic layers. The layer 258 is composed for example of Ta 0.2 nm/(Co 0.4 nm/Ta 0.1/Pt 0.5 nm)$_4$. The layer 257 is composed for example of Ru of 0.8 nm. The layer 256 is for example composed of (Co 0.4 nm/Ta 0.1/Pt 0.5 nm)$_6$.

Finally, the metal layer 251 is relatively thick to enable the opening of the upper contact of the spintronic device 200. It is composed for example of TiN or Ta and enables an electrical contact with the electrode 260.

[FIG. 3] schematically represents the manufacturing method 300 according to the invention. The first step 10 consists in depositing a sacrificial layer on the substrate 210. The second step 20 consists in forming a flared cavity in the sacrificial layer. The third step 30 consists in filling the flared cavity with magnetic material. The fourth step 40 consists in eliminating the excess of magnetic material and planarizing. The fifth step 50 consists in removing all or part of the sacrificial layer. The sixth step 60 consists in depositing the remainder of the magnetic and non-magnetic layers 230 and 250. The seventh step 70 consists in filling the remaining spaces with a dielectric material. The eighth step consists in eliminating the dielectric material to open the upper contacts of the spintronic device 200. The ninth step consists informing the upper electrode 260.

The different steps of the method 300 are described in greater detail hereafter.

First Step

[FIG. 4] represents the first step 10 of the method for manufacturing 300 the spintronic device 200. It consists in the deposition of a sacrificial layer 400 of thickness H on a substrate 210 comprising conductive zones 220 emerging at the surface of the substrate. The substrate 210 on which the method of the invention is carried out typically consists of an electrically insulating surface (for example made of SiO2 or SiOCH) pierced with conductive zones 220, typically made of copper. This substrate may be manufactured by CMOS technology and already contains in this case selection transistors, optionally logic circuits, and at least the first metallisation level (commonly called M1). The minimum distance between the conductive zones 220 is of the order of F, where F designates the minimum size of the objects produced (resolution) in the technology used. But this distance may take any value above the minimum value F. Typically, an array of zones 220 with a centre to centre inter-zone distance between 2F and 3F will be used. In the case of hybrid memory/logic circuits, this substrate 210 may correspond to a localised zone on a complete wafer. The remainder of the zone is then protected during the manufacture of the memory point by a sacrificial material or by an insulator that will be able to be removed at the end of the method or in the course of the method.

The deposition of the sacrificial layer 400 may be carried out by a physical vapor deposition (PVD) method such as cathodic sputtering, well known to those skilled in the art. This sacrificial layer 400 is in fact the layer in which the magnetic pillars are going to be formed. It is thus necessary that its thickness H is at least of the order of magnitude of a characteristic dimension D of the magnetic pillar 240, in order that the magnetic pillar 240 has a sufficient height H thereafter to allow the device to benefit from perpendicular shape anisotropy (PSA). The height H must also be significantly greater than the thickness of the other magnetic and non-magnetic layers 250, 230 of the spintronic device 200 which are going to be deposited at step 60 so that the device 200 structures itself naturally on top of the magnetic pillar 240 and to avoid inter-pillar 240 short-circuits.

This layer 400 is in fact going to be entirely or in part removed at step 50. Thus, it is necessary that the material forming the layer 400 is different from the material forming the substrate 210 and surrounding the conductive zones 220 so that it can be removed by a solvent or appropriate plasma attack without removing the oxide surrounding the conductive zones 220 and without attacking the magnetic pillars 240. The material forming this layer 400 is preferably an insulator material used in CMOS technology for the electrical insulation of the conductive lines or conductive vias, preferentially a silicon oxide SiO2, but it may also be another material such as a polymer, a SiOCH, Si3N4 or SiCN material. The material must be insulating if it is only partially removed but does not need to be insulating if it is entirely removed at step 50.

In an alternative of the invention, the layer 400 may be formed of several layers, with for example a SiCN lower layer and a SiO2 upper layer. The lower layer may thus play the role of dielectric barrier to the diffusion of metal from the conductive zones 220 of the substrate 210.

Second Step

Figure 5:
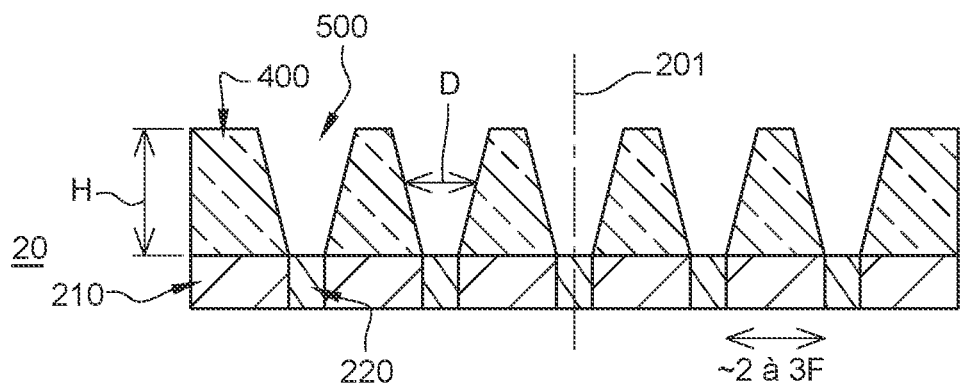
FIG. 5 shows a schematic representation of the result of the second step of the method according to the invention.

[FIG. 5] schematically represents the second step 20 of the method 300. It consists in forming at least one flared cavity 500, traversing the sacrificial layer 400, the base of which is facing the surface of the conductive zone 220 of the substrate 210. "The base of which is facing the surface of the conductive zone 220 of the substrate 210" is taken to mean for example in the case where the conductive zone 220 is a via used in microelectronics to connect two levels of conductors, that the vertical axis 201 of said cavity 500 is aligned with the vertical axis of the conductive zone 220 of the substrate 210 to form an electrical contact between the conductive zone 220 and the magnetic pillar 240. The formation of the cavity 500 may be done for example by damascene or dual damascene etching of the material forming the sacrificial layer 400.

The "damascene" method constitutes an alternative to plasma etching (IBE or reactive plasma) for structuring the storage elements of MRAMs, CBRAMs and OxRAMs. This method, normally used for the manufacture of metal interconnections of integrated circuits, consists in defining the imprint of the element in an insulating material, then in depositing materials on the whole of the substrate. A chemical mechanical polishing makes it possible to eliminate the excess of materials outside of the imprint.

This second step 20 of forming the cavity 500 could be carried out with a "single damascene" or "dual damascene" approach. An exemplary "single damascene" approach is represented in FIG. 5, whereas the "dual damascene" approach is not represented. In the "single damascene" method, a single pattern (for example a via or a line) is formed then filled with metal in the dielectric layer 400, whereas the "dual damascene" method simultaneously fills two superimposed patterns, for example an interconnection via and an interconnection line covering the via. In this latter case, magnetic pillars 240 in two parts are obtained. It is thus possible to obtain structures with a notched profile, that is to say for which the section of the lower part is smaller than the section of the upper part.

The magnetic pillars 240 produced by a damascene approach have a slightly re-entrant side because this type of profile is favourable to metallisation. This type of re-entrant profile will here be desired.

It goes without saying that the sides of the holes do not need to be straight as in FIG. 5. They may be curved, or even stepped. For all of these shapes of magnetic pillars 240, the important thing is that the magnetic material that is going to fill these cavities 500 at step 30 has sufficiently overhanging sides to avoid inter-pillar 240 short-circuits as explained previously and a perpendicular shape anisotropy suitably adjusted with respect to the specification desired for the targeted application. The inclination of the sides that it will be desired to obtain depends on the directivity of the depositions of the other layers 250 constituting the magnetic stack deposited at step 60. This inclination may be typically between 5° and 45° from the axis 201. Furthermore, as stated previously, the overhanging aspect of the sides may be achieved by giving not an inversed conical trunk shape to the cavities but for example a shape of two cylinders with coaxial stacked vertical sides, the upper cylinder having a diameter greater than the diameter of the lower cylinder.

Third Step

Figure 6:
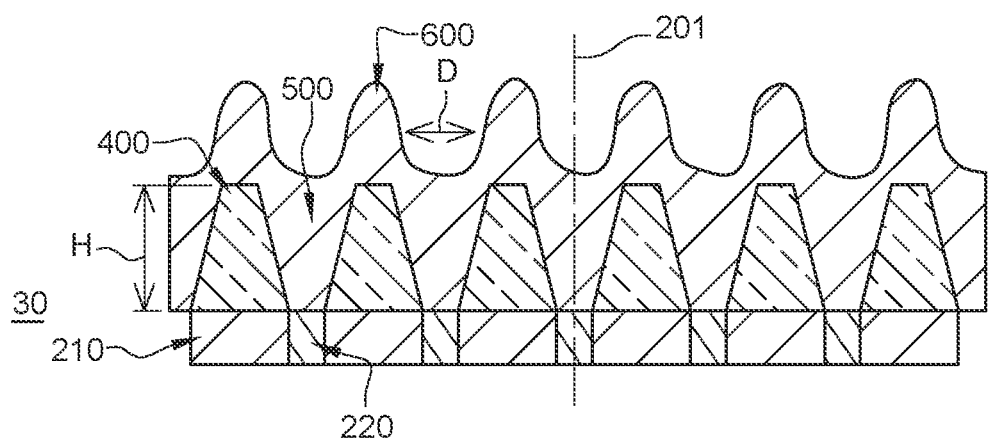
FIG. 6 shows a schematic representation of the result of the third step of the method according to the invention.

[FIG. 6] schematically represents step 30 of the method 300. It consists in depositing at least one thick magnetic layer 600 in the cavity 500, of thickness H of same order of magnitude as a characteristic dimension D of the cavity 500. This thick magnetic layer 600 is going to form the magnetic pillars 240 on which are going to be deposited the remainder of the layers 250 forming the spintronic device 200.

Before the deposition of the material in the flared cavities 500, an etching may be carried out to remove potential residues or oxide layers which could exist at the bottom of the flared cavities 500 and could adversely affect the good electrical contact between the conductive lines 220 of the substrate 210 and the thick magnetic layer 600.

In the case of magnetic tunnel junctions for the production of STT-MRAMs with perpendicular anisotropy, the material that forms the thick magnetic layer 600 is preferentially a material with low Gilbert damping such as a FeCoB alloy rich in Fe or even pure iron or Permalloy or a Heusler alloy with low damping (for example $Co_2FeAl$, $Co_2FeAl_{0.5}Si_{0.5}$, $Co_2Fe_{0.4}Mn_{0.6}Si$, $Co_2Fe_{0.4}Ga_{0.5}Ge_{0.5}$).

An alternative to the use of a thick mono-material magnetic layer is the use of a stack of several layers of magnetic and non-magnetic materials to form the thick magnetic layer 600. In particular, a non-magnetic buffer layer may be deposited firstly to promote the growth of the following layers (for example Ta or NiFeCr of 3 nm or materials commonly used as diffusion barriers in the manufacture of interconnections such as TiN or TaN). This buffer layer may be surmounted by a thin layer of cobalt such as that used as liner in the manufacture of interconnections to favour the growth of the following layers, itself surmounted by a thick magnetic layer with low Gilbert damping (for example NiFe, Fe or FeB), itself being able to be surmounted by a layer of another magnetic material being able to be amorphous (for example a FeCoB alloy, as represented in FIG. 2b layer 259). This layer may also incorporate thin laminations (thickness of the order of 0.1 to 0.4 nm thickness) of materials such as Ta, W, Mo, etc, capable of absorbing the amorphising element such as the boron contained in FeCoB or FeB alloys during the annealings necessary for the manufacture of the final device. It may be preferable to end with an amorphous material so that during step 40 of planarization, the surface of this magnetic pillar 240 is very smooth. Indeed, in the case of polycrystalline materials, if the chemical mechanical polishing (CMP) technique is used to planarize, this may lead to metal grains being pulled off generating an important surface roughness of the pillars 240. This amorphous material must not be too oxidisable on the surface so that at the end of step 40 the optional surface oxide layer may easily be removed by surface etching prior to the deposition of the following layers. Indeed, such an interfacial oxide layer could adversely affect, if needs be, good magnetic coupling being obtained between the magnetic pillar and the first layer 259 deposited at step 60 and could add an electrical resistance which could be of the same order of magnitude or greater than that of the non-magnetic spacer 254.

The different layers being able to form the thick magnetic layer 600 may be deposited by different methods known to those skilled in microelectronics such as atomic layer deposition (ALD), chemical vapour deposition (CVD), physical vapour deposition (PVD) in particular cathodic sputtering or even electrodeposition (in particular for soft Permalloy alloy based on Ni and Fe, of which one of the possible compositions is $Ni_{80}Fe_{20}$).

Fourth Step

Figure 7:
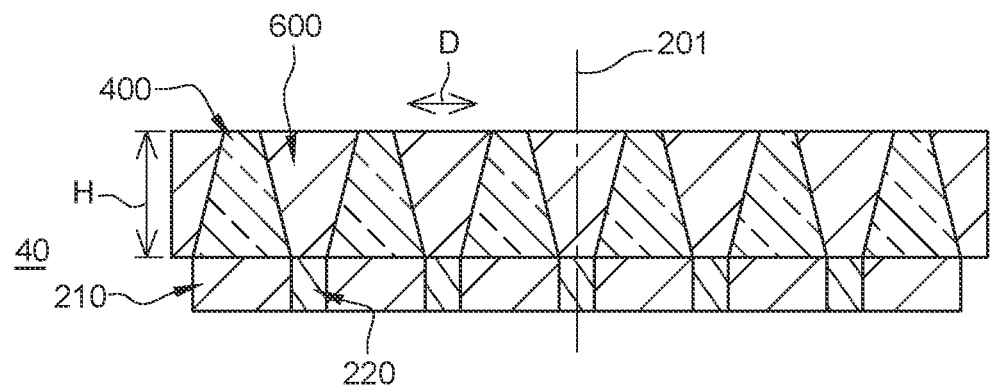
FIG. 7 shows a schematic representation of the result of the fourth step of the method according to the invention.

[FIG. 7] schematically represents the result of step 40. This step consists in eliminating the excess of thick magnetic layer 600 outside of the cavity 500 and planarizing the surface of said thick magnetic layer 600. This step 40 may be carried out thanks to a polishing, for example a chemical mechanical polishing (CMP), method well known to those skilled in the art. The aim of this fourth step 40 is to obtain magnetic pillars 240 of low surface roughness to enable the growth of the remainder of the spintronic device 200. For a magnetic tunnel junction, it will be typically desired to have a surface roughness less than 0.4 nm RMS to obtain good growth of the remainder of the structure and avoid the formation of metal bridges through the tunnel barrier layer 254.

Fifth Step

Figure 8:
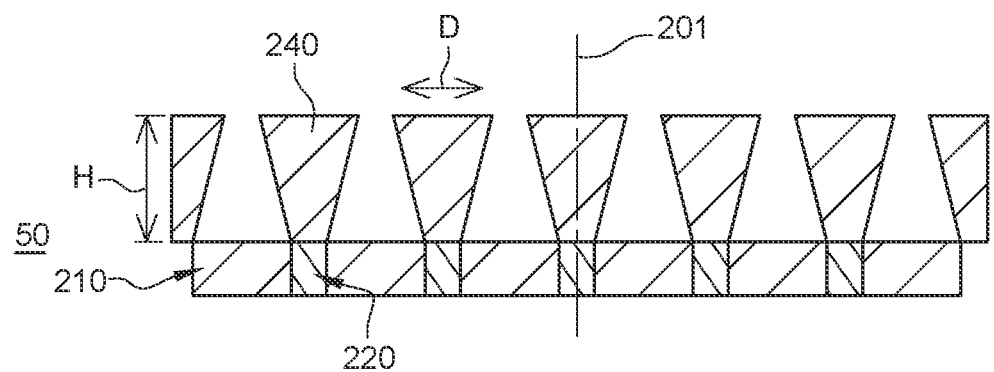
FIG. 8 shows a schematic representation of the result of the fifth step of the method according to the invention.

[FIG. 8] schematically represents the result of step 50. This step consists in removing at least a part of the sacrificial layer 400 in order to form at least one magnetic pillar 240. This removal of the sacrificial layer 400 surrounding the magnetic pillars 240 is preferentially carried out uniformly. Thus, as indicated previously, it is necessary that the material forming the layer 400 is different from the material forming the substrate 210 and surrounding the conductive zones 220 so that it can be removed by an appropriate solvent without removing the material forming the substrate 210 surrounding the conductive zones 220 and without attacking the magnetic pillars 240.

Depending on the material used for the sacrificial layer 400, this method of removing the sacrificial layer 400 could be carried out, without this being limiting, by chemical attack. In the case where the material forming the sacrificial layer 400 surrounding the magnetic pillars 240 is a SiO2 type insulator, this method could be carried out by chemical process using as an example a dilute hydrofluoric acid solution or vapour phase hydrofluoric acid. This removal could also be carried out by dry process using a Siconi type method such as described in the document [Tavemier, A.; Favennec, L.; Chevolleau, T. & Jousseaume, V. c. Innovative gap-fill strategy for and nm shallow trench and isolation and ratio and: IEEE, 2012]. For a carbon based insulator, an oxygen based plasma could be used. For a porous SiOCH material, the combination could be used of an oxygen plasma followed by a chemical attack with dilute hydrofluoric acid which removes the porous part of the SiOCH material modified by the oxygen plasma. The method of removing the insulator must not lead to a roughening of the surface of the magnetic pillar 240 to ensure compatibility with the deposition of the other layers 250 forming the magnetoresistive element produced at the surface of the magnetic pillar 240 at step 60. The thickness of dielectric layer 400 thus removed must be significantly greater than the sum of the thicknesses of the other layers 250, i.e. more than 1 times the cumulative thickness of said layers 250, for example 1.2 times and preferably at least 2 times. The thickness of sacrificial layer 400 removed at this step will be adjusted by playing on the method time.

In an alternative embodiment, the dielectric layer 400 is removed entirely. The magnetic pillars 240 stand upright on the substrate 210, even in the absence of the layer 400 (then the whole of the structure will be consolidated by the dielectric filling material 270).

At the end of this step 50, at least one magnetic pillar 240 is obtained of height H of same order of magnitude as a characteristic planar dimension D, of flared shape and forming a thick magnetic layer comprised in the storage layer 255, on which it is going to be possible to deposit the remainder of the magnetic and non-magnetic layers 250 forming the spintronic device 200.

Sixth Step

Figure 9:
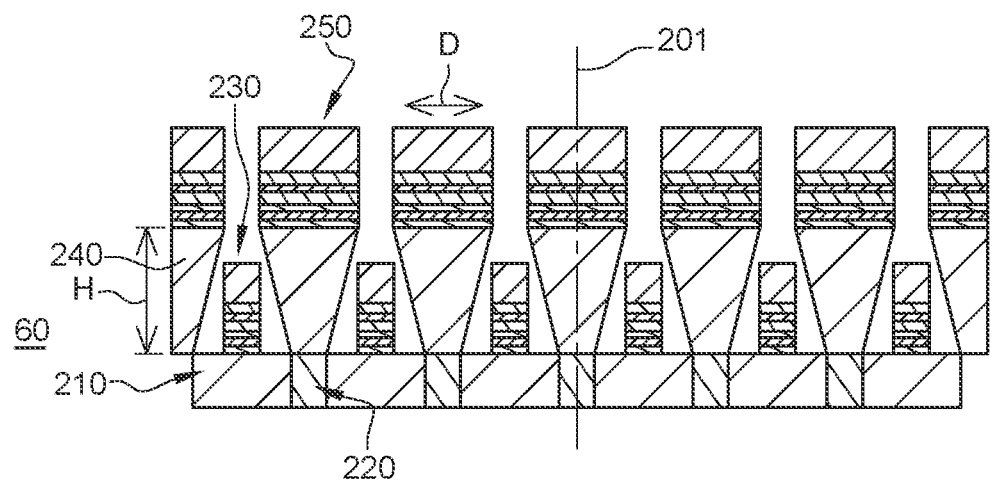
FIG. 9 shows a schematic representation of the result of the sixth step of the method according to the invention.

[FIG. 9] schematically represents the result of step 60. It consists in the deposition of the remainder of the magnetic and non-magnetic layers 250 and 230, forming the spintronic device 200 such that:

Each magnetic pillar 240 is surmounted by layers 250 and surrounded by layers 230 and There is no electrical contact between the magnetic pillar 240 and said layers 230 surrounding said magnetic pillar 240.

The deposition of the remainder of the magnetic and non-magnetic layers 250 at the tops of the magnetic pillars 240 may comprise the deposition of one or more materials, depending on the envisaged technology of memories or logic elements. The different magnetic and non-magnetic layers 250, 230 may be deposited by different techniques and along different incidences (cf. FIGS. 9, 10a and 10b).

Cathodic sputtering is advantageously used at step 60. This technique has a certain directivity making it possible to direct the deposition of resistive material at the magnetic pillars 240, notably at their top 250. However, a part of the resistive material and the covering material is also deposited at the bottom of the trenches situated between the magnetic pillars 240, or even on a part of the sides of the pillars depending on the incidence of the deposition and the angular dispersion of the flux of atoms coming from the sputtered target, then forming residual depositions 230. In normal incidence with respect to the surface of the substrate and with a sufficiently directive deposition technique (case represented in FIG. 9), these residual depositions 230 are localised around the centre of the trenches and are not deposited on the sides of the magnetic pillars 240. The more overhanging the sides of the magnetic pillars 240, the less the depositions 230 are spread out near to the base of the sides.

The formation of set-back sides of the magnetic pillars 240 thus prevents the simultaneous deposition of resistive material on two sides facing each other and belonging to different pillars, which avoids a short-circuit between these two magnetic pillars 240. Preferably, the cathodic sputtering is collimated in order to increase the directivity of the deposition and thus decrease the extent of the residual depositions 230 at the bottom of the trenches. The depositions 230 may be left as such. Thanks to the electrical discontinuity on the sides of the magnetic pillars 240, they do not disrupt significantly the operation of the spintronic device. In particular, they do not create inter-pillar 240 short-circuits. In fact, the plurality of layers 230 at the bottom of the trenches separating the pillars 240 may even improve the operation of the device 200 by playing the role of screen absorbing the magnetic flux emanating from the deposition of the layers 250 at the top of the magnetic pillars 240.

Figure 10A:
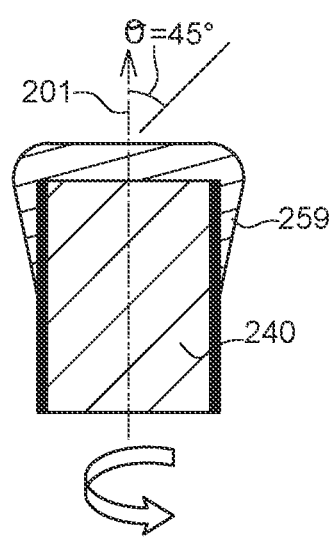
FIGS. 10a and 10b illustrates the formation of a magnetic tunnel junction by cathodic sputtering during the method according to an embodiment of the invention.

[FIG. 10a] represents in detail the formation of a magnetic tunnel junction of a MRAM at the top of a magnetic pillar 240 by oblique incidence cathodic sputtering of the dielectric material constituting the tunnel barrier according to an alternative of the invention. The magnetic layer 259 is firstly deposited in normal incidence on the magnetic pillar 240. Due to the angular dispersion of the flux sputtered by cathodic sputtering, the magnetic layer 259 may overflow onto the upper part of the sides of the pillar 240 as represented in FIG. 10a. This magnetic layer 259 forms the part of the storage layer in contact with the non-magnetic spacer 254.

Figure 10B:
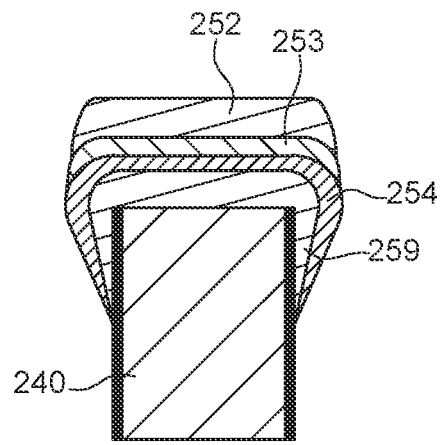

[FIG. 10b] represents in detail the formation of a magnetic tunnel junction of a MRAM at the top of a magnetic pillar 240 by oblique incidence cathodic sputtering of the dielectric material constituting the tunnel barrier according to the same alternative of the invention as FIG. 10a.

When the non-magnetic spacer 254 is a tunnel barrier, the deposition of the tunnel barrier layer 254 made of MgO on the storage layer formed by the magnetic pillar 240 and the magnetic layer 259 is advantageously carried out by oblique incidence cathodic sputtering according to an angle 9 measured with respect to the axis 201 of the magnetic pillar 240, for example equal to 45°, while the substrate 210 is in rotation. This makes it possible to completely encapsulate the magnetic pillar 240 in MgO and thus minimise the risks of short-circuits at the edge of the pillars 240.

Thus, a lateral thickness gradient of the tunnel barrier layer 254 made of MgO may be obtained by playing on the incidence of the deposition. By using a high incidence angle (approaching a grazing incidence), it is possible to obtain a greater thickness of MgO at the edge of the pillar and on the sides of the pillar 240 than at the centre of the upper surface of the pillar. This gradient is particularly advantageous when the final device is used for example as MRAM memory element Indeed, when a voltage is applied to either side of the magnetic tunnel junction, electrical current flows through the tunnel barrier layer 254 and preferentially at the centre thereof, that is to say in the portion where its thickness is the lowest. Thus, it is possible to reduce the impact of potential edge defects on the electrical and magnetic properties of the memory points and thus reduce variability from one memory point to another in a MRAM.

The formation of the spintronic device 200 ends by the deposition of the reference layer 253 on the non-magnetic spacer 254, the deposition of the layers forming the synthetic antiferromagnetic layer SAF 252, then the covering element 251 (not represented) is deposited on the layer 252. These depositions (253, 252, 251) are, preferably, carried out by cathodic sputtering collimated according to a normal incidence, in order to avoid the layers 253, 252 and 251 from overflowing onto the sides of the magnetic pillar 240 (which could cause a short-circuit through the tunnel barrier when the device is a magnetic tunnel junction).

In an alternative embodiment, the layers 250 deposited on the magnetic pillars 240 may also be a giant magnetoresistance stack such as a spin valve. This may be interesting in applications where the current density traversing the device 200 must be important as in certain radiofrequency or magnetic field sensor applications. Compared to a tunnel junction, the essential difference is that the non-magnetic spacer 254, instead of being a tunnel barrier is then a spacer typically of copper and the layers surrounding this spacer are rather alloys of FeCoNi type of face centred cubic (fcc) structure, as is known to those skilled in the art.

Seventh Step

Figure 11:
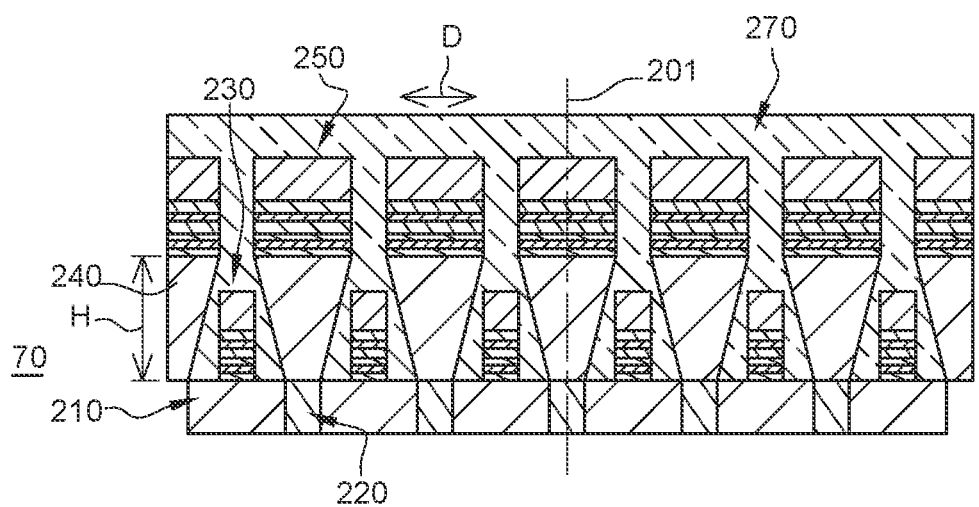
FIG. 11 shows a schematic representation of the result of the seventh step of the method according to the invention.

[FIG. 11] schematically represents the result of step 70. The seventh step 70 consists in filling the spaces between the magnetic pillars 240 and between the elements 250 surmounting the magnetic pillars 240 with a dielectric material 270.

Various techniques of the microelectronic industry make it possible to fill with dielectric material (generally an oxide) structures with high form factor (type STI, FinFET, "damascene" gate transistor, etc.) and/or with overhanging sides. The gas phase deposition of liquid dielectric films may notably be cited. Liquid dielectrics are similar to a gel having the flow characteristics of a liquid. By exploiting this technique, it is easily possible to fill structures with form factors greater than 10, even going up to 30.

The liquid dielectric material 270 for filling the inter-pillar trenches of FIG. 11 may be chosen from Si3N4, SiO2, SiOxCyHz, SiOxHy and SiOxNyHz. These materials are chosen for their electrical resistivity (advantageously $\rho$>0.1 $\Omega \cdot cm$) in order that leakage currents between memory points are minimised. For example, to form a liquid silicon oxide, the substrate is exposed simultaneously to a silicon containing gaseous precursor and to an oxidising gas. The silicon containing gas and the oxidising gas are either mixed before their introduction into the reactor or injected separately into the reactor. The silicon containing precursor may be an alkoxysilane, for example Hx-Si—(OR)y where x=0-3, x+y=4 and R designates an alkyl group. Silane (SiH4) and derivatives thereof, such as tetraethoxysilane (TEOS), triethoxysilane (TES), trimethoxysilane (TriMOS), methyltrimethoxysilane (MTMOS), dimethyldimethoxysilane (DMDMOS), diethoxysilane (DES), dimethoxysilane (DMOS), hexamethoxydisilane (HMODS) and triphenylethoxysilane, or instead tetraoxymethylcyclotetrasiloxane (TOMCTS), octamethylcyclotetrasiloxane (OMCTS), methyltriethoxyorthosilicate (MTEOS), tetramethylorthosilicate (TMOS), 1-(triethoxysilyl)-2-(diethoxymethylsilyl)ethane and tri-t-butoxylsilanol are other examples of silicon containing precursors. The oxidising gas may be ozone (O3), hydrogen peroxide ($H_2O_2$), oxygen (O2), water (H2O), methanol, ethanol, isopropanol or a nitric oxide (NO, N2O). The temperature of the substrate and the working pressure in the reactor make it possible to adjust the deposition rate. Generally, the temperature of the substrate is comprised between −30° C. and 100° C. (a low temperature makes it possible to increase the deposition rate). The pressure is for example comprised between 100 mTorr and atmospheric pressure.

The advantage of this technique compared to other gas phase deposition techniques is the absence of voids or cavities in the layer of dielectric material 270. However, the presence of voids in the inter-pillar space is not detrimental, as long as a flat and continuous surface is obtained at the end of step 80. The techniques of physical vapour deposition (PVD), plasma enhanced chemical vapour deposition (PECVD), atomic layer deposition (ALD) form layers of uniform thickness and are thus liable to form voids in structures with high form factor, a fortiori when they have set back sides (because they rapidly lead to narrowing at the top of the structure).

An alternative to gas phase methods is deposition by centrifugation. In this case, a sol-gel precursor is diluted in a solvent and deposited in liquid form on the rotating substrate 210. Under the effect of centrifugal force, the liquid spreads out in a uniform manner on the surface of the substrate. The precursors polymerise and the solvent evaporates to form a dielectric material called "Spin On Glass" (SOG). The thickness of the deposited layer is controlled by the viscosity of the material and the speed of rotation of the substrate 210. The materials thus produced may be silicas or silicones of polymethylsiloxane, polymethylsilsesquioxane, polyoxycarbosilane, polydimethylsiloxane type. They may also be polymers, such as planarizing resins, for example that sold by the "Honeywell" Company under the denomination "ACCUFLO".

A partial filling of the trenches may be envisaged, in so far as electrical insulation is ensured even in the presence of voids. This may make it possible to reduce inter-pillar conductance and thus minimise the risks of crosstalk between the magnetic pillars 240.

With all the aforementioned deposition techniques, it is difficult to obtain directly a flat surface at the level of the upper face of the covering elements 251. Consequently, it is preferable to cover entirely the vertical structures with the dielectric material 270 and next to eliminate excess material.

Eighth Step

Figure 12:
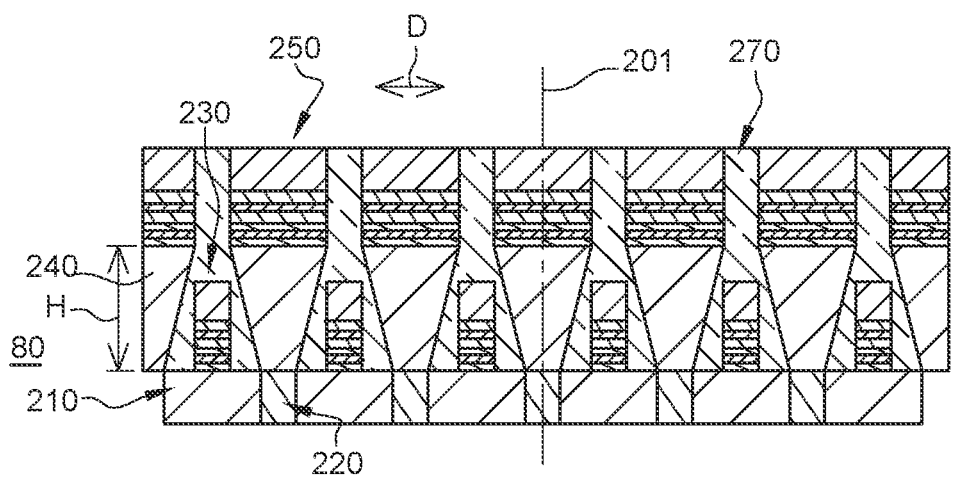
FIG. 12 shows a schematic representation of the result of the eighth step of the method according to the invention.

[FIG. 12] schematically represents the result of step 80. Step 80 consists in carrying out a polishing to eliminate the excess of dielectric filling material 270 deposited at the preceding step 70 in order to have access to the upper surface of the element 251 surmounting the magnetic pillar 240.

To do so, it is possible to use a method of chemical mechanical polishing (CMP) or an "etch back" plasma type etching when the deposition of the dielectric material 270 already tends to produce a flat layer. In the case of etching, a plasma method is used to etch the planarizing and insulating material. The methods typically used are based on inductive or capacitive plasmas based on fluorocarbon gases such as CF4, CHF3, CH2F2, C4F8, C4F6 or combinations thereof with optionally the addition of additional gases such as N2, O2, Ar or combinations thereof. The method is carried out at a low pressure typically comprised between 4 mTorr and 400 mTorr.

In a conventional manner, the method of polishing or plasma etching is stopped when the covering material 251 is reached. This may be done by controlling the polishing/etching conditions, knowing the etching rate and the thickness of the material to etch, or by detecting the end of etching during the method (for example by reflectometry or optical emission spectroscopy).

Ninth Step

Figure 13:
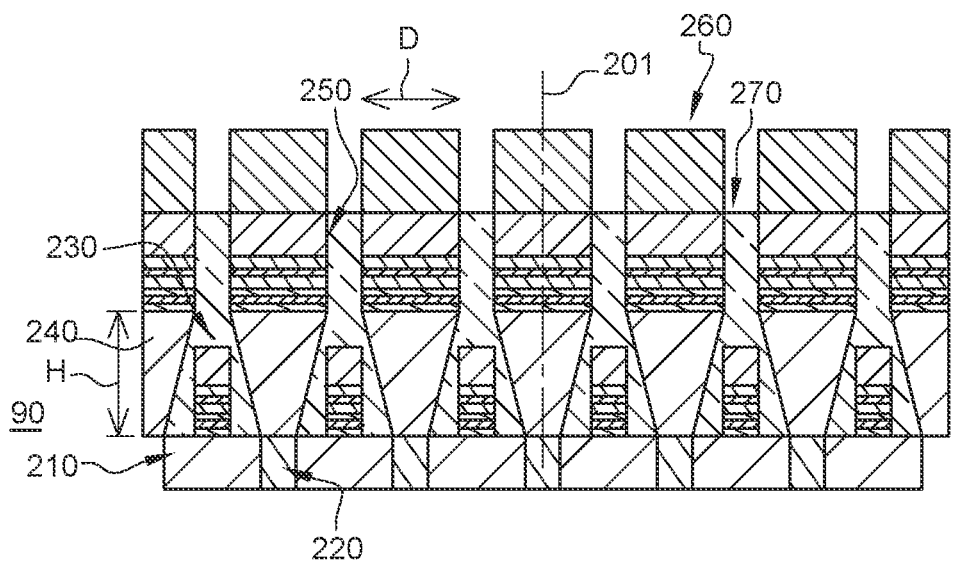
FIG. 13 shows a schematic representation of the result of the ninth and final step of the method according to the invention.

[FIG. 13] schematically represents the result of step 90. The ninth step consists in forming an upper electrode 260 on the surface of the element 251 surmounting the magnetic pillar 240, in such a way as to make an electrical current flow through the device 200.

This step 90 is carried out with standard microelectronics methods, either with a so-called partition method, or with a so-called damascene method, or with a lift-off method.

In a so-called partition method, the metal (typically Al, Ti, TiN, Ta, TaN, W, Si highly doped) is deposited as a thin layer on the layer 251, then an etching mask is formed by lithography and/or the combination of the deposition of a hard mask, lithography, and etching of the hard mask. The patterns are then transferred into the metal by a preferentially anisotropic etching method. The mask is next removed by a dry or wet method. The etching method is adapted to the metal composing the electrode 260. For example, for an electrode made of Al, an inductive plasma method based on BCl3/Cl2 could be used with a pressure of the order of 5 mTorr.

In a so-called damascene method, an insulator is deposited as a thin film on the layer 251, then an etching mask is formed at the surface thereof by lithography and/or the combination of the deposition of a hard mask, lithography, and etching of the hard mask. An etching method is next used to etch the imprint of the electrode 260 in the insulator material. The metal composing the electrode 260 is then deposited in the cavity thus formed, and excess metal is eliminated by chemical mechanical polishing. The insulator material is typically a silicon oxide or a silicone. The etching method is typically a plasma method based on fluorocarbon gases such as CF4, CH2F2, CHF3, C4F8, C4F6 or combinations thereof, with optionally the addition of additional gases such as N2, O2, Ar or combinations thereof. The method is carried out at a low pressure typically comprised between 4 mTorr and 400 mTorr.

The deposited metal may be Cu, Ti, Al, W. The conductor may optionally be composed of several metals such as for example a thin layer of Ti or TiN and a layer of Cu.

In a lift-off method, patterns are formed by lithography in a photosensitive resin. A non-conformal deposition of metal is then carried out on top of the resin and between the patterns of resin. The resin is next removed (and with it the metal deposited on its surface), only leaving metal in the places where it had been deposited between the patterns of resin. This type of method will be preferentially used for contaminant and difficult to etch metals such as Ni, Pt, Au, Ag.

Other Embodiments

It goes without saying that the method 300 described previously may be used to produce other types of spintronic devices, whether they are other types of memory devices such as SOT-MRAMs, voltage controlled MRAMs, radiofrequency components using STT or SOT phenomena, or even magnetic field sensors.

For example, for a SOT-MRAM, the conductive zones 220 could be conductive lines of "interconnect" type made of heavy metal having strong spin orbit coupling, for example Ta, Pt or W. The magnetic pillars 240 forming the major part of the thick storage layer 255 of the SOT-MRAM cell will then be produced directly on top of these conductive lines 220.

[FIG. 14] the structure is then in the form represented in FIG. 14. The memory elements are then devices with 3 terminals as is well known for SOT-MRAMs. Obviously, several tunnel junctions may share a same line as is well known in SOT-MRAM architectures.

For a PSA-STT-MRAM, the conductive zones 220 could be replaced by vias. The magnetic pillars 240 forming the major part of the thick storage layer 255 of the PSA-STT-MRAM cell will then be produced directly above these vias, their vertical axis being for example aligned with the centre of the via.

In the case of radiofrequency (RF) components based on STT and SOT, the overall structure of the device is similar to that of tunnel junctions for PSA-STT-MRAMs. However, the thickness H of the storage layer will be adjusted differently compared to a memory because it will be desired for a RF component, for example of oscillator type, not to have an important thermal stability of the magnetisation (being able to ensure a retention of 10 years for example) but to enable the magnetisation of the thick layer to precess under the effect of the excitation current. Automatically thus, the thermal stability factor of the magnetic pillar 240 will here be chosen lower than for a memory. This will be done by adjusting in an appropriate manner the height H of the magnetic pillar 240 with respect to its lateral geometry as is known by those skilled in the art.

For the production of a magnetic field sensor, it will be desired to give to the magnetic pillar 240 forming the sensitive active layer of the sensor, a small effective anisotropy, that is to say an effective anisotropy such that the effective magnetic anisotropy field of this layer is of the order of the magnetic field dynamic that it is desired to measure. If it is desired to measure a field perpendicular to the substrate 210, a slightly negative effective anisotropy will be given to the pillar 240 favouring an in-plane orientation of the magnetisation. This magnetisation will be drawn out-of-plane by the field to measure. The reference layer 253 will have its magnetisation out-of-plane. If it is desired to measure a planar field, a shape favouring out-of-plane anisotropy of the layers will be given to the magnetic pillar 240, the reference layer 253 being this time trapped in the direction of the plane parallel to the direction of the field to measure.

The invention claimed is:

1. A method for manufacturing a spintronic device comprising at least a non-magnetic spacer, a reference layer and a storage layer comprising at least one magnetic pillar, the method comprising:
    depositing at least one sacrificial layer of a total thickness at least equal to a targeted thickness of the at least one magnetic pillar to be formed on a substrate comprising at least one conductive zone having a top surface that is level with a surface of the substrate;
    forming at least one flared cavity, traversing said at least one sacrificial layer, a lowermost portion of the at least one flared cavity facing a surface of a corresponding one of the at least one conductive zone of the substrate;
    depositing at least one magnetic layer in a respective one of said at least one flared cavity, of a thickness equal to or greater than the targeted thickness of the at least one magnetic pillar;
    eliminating an excess of the at least one magnetic layer outside of the at least one flared cavity and planarizing a surface of said at least one magnetic layer to reach the targeted thickness of the at least one magnetic pillar;
    removing at least a part of the at least one sacrificial layer in order to form, from a remainder of the at least one magnetic layer, the at least one magnetic pillar forming all or part of the storage layer of said spintronic device;
    depositing at least the non-magnetic spacer and the reference layer such that the at least one magnetic pillar is surmounted by at least said non-magnetic spacer and said reference layer;
    filling spaces adjacent the at least one magnetic pillar with a dielectric filling material;
    carrying out a polishing to eliminate an excess of the dielectric filling material deposited at the preceding step in order to have access to an upper surface of an element surmounting the at least one magnetic pillar; and
    forming an electrical contact on a surface of the element surmounting the at least one magnetic pillar.

2. The manufacturing method according to claim 1, wherein the depositing of the at least the non-magnetic spacer and the reference layer is carried out such that each magnetic pillar is further surrounded by the materials comprising at least said non-magnetic spacer and said reference layer and such that there is no electrical contact between said at least one magnetic pillar and the materials comprising at least said non-magnetic spacer and the reference layer surrounding said at least one magnetic pillar.

3. The manufacturing method according to claim 1, wherein the forming the at least one flared cavity is carried out with a damascene or dual damascene approach.

4. The manufacturing method according to claim 1, wherein a flared cavity produced during the forming of the at least one flared cavity has a section at its base smaller than at its top.

5. The manufacturing method according to claim 1, wherein said at least one magnetic layer is mainly formed of a material having a low Gilbert damping.

6. The manufacturing method according to claim 1, wherein the spintronic device is a perpendicular shape anisotropy spin transfer torque magnetic random access memory point or PSA-STT-MRAM.

7. The manufacturing method according to claim 1, wherein the spintronic device is a perpendicular shape anisotropy spin orbit torque magnetic random access memory point or PSA-SOT-MRAM.

8. The manufacturing method according to claim 1, wherein the spintronic device is a magnetic field sensor.

9. The manufacturing method according to claim 1, wherein the spintronic device is a radiofrequency component.

* * * * *